US008830677B2

(12) United States Patent
Chiu et al.

(10) Patent No.: US 8,830,677 B2
(45) Date of Patent: Sep. 9, 2014

(54) ENGAGING STRUCTURE BETWEEN A HOUSING AND AN INFLATABLE ELEMENT

(75) Inventors: Yi-Chung Chiu, Taoyuan (TW); Chien-Kun Hsu, New Taipei (TW); Chu-Fang Yang, Tainan (TW)

(73) Assignee: Hannstar Display Corporation, New Taipei (TW)

( * ) Notice: Subject to any disclaimer, the term of this patent is extended or adjusted under 35 U.S.C. 154(b) by 204 days.

(21) Appl. No.: 13/550,868

(22) Filed: Jul. 17, 2012

(65) Prior Publication Data

US 2013/0308250 A1    Nov. 21, 2013

(30) Foreign Application Priority Data

May 21, 2012 (CN) .......................... 2012 1 0158418

(51) Int. Cl.
*H05K 7/20* (2006.01)
(52) U.S. Cl.
USPC ...... 361/689; 361/679.55; 361/692; 248/444; 248/918; 108/43; 206/522; 206/562; 206/724
(58) Field of Classification Search
USPC ....................... 361/676–678, 679.46–679.54, 361/688–722, 752, 831
See application file for complete search history.

(56) References Cited

U.S. PATENT DOCUMENTS

| 5,005,702 | A | * | 4/1991 | Davis et al. | 206/562 |
| 5,623,869 | A | * | 4/1997 | Moss et al. | 108/43 |
| 7,992,502 | B1 | * | 8/2011 | Davis | 108/43 |
| 2002/0085342 | A1 | * | 7/2002 | Chen et al. | 361/683 |
| 2005/0072893 | A1 | * | 4/2005 | Brown | 248/444 |
| 2013/0277529 | A1 | * | 10/2013 | Bolliger | 248/676 |

* cited by examiner

*Primary Examiner* — Courtney Smith
(74) *Attorney, Agent, or Firm* — Bacon & Thomas, PLLC

(57) ABSTRACT

The present invention is to provide an engaging structure applicable to a display device and including a housing and an inflatable element, wherein the housing serves as a protective case of the display device and is formed with at least one assembly hole, and the inflatable element is formed with at least one connecting portion, such that, when the housing is assembled into an accommodating space of the inflatable element and the inflatable element is fully inflated, the connecting portion is engaged in the corresponding assembly hole. Thus, the portions of the inflatable element that correspond in position to the accommodating space are tightly pressed against the sides of the housing other than the side where a screen is installed at the display device. Since the inflatable element is lightweight and occupies a tiny space while in a deflated state, it will effectively reduce storage space and transportation costs.

4 Claims, 5 Drawing Sheets ary element 13 alone when only the decorative element 13 is damaged. The user must in that case replace the entire display device 1 or put up with the damaged look, either of which is highly undesirable.
ENGAGING STRUCTURE BETWEEN A HOUSING AND AN INFLATABLE ELEMENT

FIELD OF THE INVENTION

The present invention relates to an engaging structure, more particularly to an engaging structure applicable to a display device and including a housing and an inflatable element, wherein the housing serves as a casing or protective case of the display device and is formed with at least one assembly hole, and the inflatable element is formed with at least one connecting portion. When the housing is assembled into an accommodating space of the inflatable element and the inflatable element is fully inflated, the connecting portion is engaged in the corresponding assembly hole, and the portions of the inflatable element that correspond in position to the accommodating space are tightly pressed against the sides of the housing other than a screen of the display device.

BACKGROUND OF THE INVENTION

The substantial advancement of industrial technologies has brought people's material life to an unprecedented high level, and with it has come the desire to further enrich the spiritual life. Therefore, when a consumer wishes to buy a certain product nowadays would not base his or her decision solely on the product's price and functions, for attention is also paid to the physical appearance and style of the product. In other words, the product of choice is one which not only satisfies functional purposes, but also is visually pleasing and spiritually refreshing. Hence, a trend has emerged to place increasing emphasis on the esthetics of product design.

Recently, with the rapid development of the electronic industry, new display devices are released to the market on a regular basis. These display devices are configured for showing multimedia images or all sorts of data and information to conveniently satisfy users' needs in work, learning, and entertainment. As such, display devices are now indispensable in many people's daily lives and consequently have a considerable market size. In order to meet consumers' various requirements for display devices and comply with the aforesaid market trend, display device manufacturers have spared no effort in making changes and improvements esthetically and are in constant pursuit of a unique eyeball-catching design that will give its manufacturer a competitive edge in the market.

FIG. 1 shows a display device in the shape of an animal. The display device 1 has a housing 11, a display screen 12, and a decorative element 13. The housing 11 houses all the necessary electronic components (not shown) of the display device 1. The display screen 12 is installed on one side of the housing 11 and is configured for displaying multimedia images or all kinds of data and information. The decorative element 13 is provided on the sides of the housing 11 and has a special design. As shown in FIG. 1, the decorative element 13 is modeled as a giraffe to lend a sense of fun, cuteness, and uniqueness to the style of the display device 1, with the intention of grabbing consumers' attention and stimulating the desire to purchase the display device 1. However, a display device manufacturer must in each consumption cycle provide its products with some novel looks so as to stay in line with fashion, keep the products new, and thereby secure its market share. If the decorative element 13 is integrally formed with the housing 11, molds must be reproduced each time the look and shape of the display device is to be renewed. It follows that production costs will be tremendously increased and that a vast storage space is required for the molds. Moreover, if the decorative element 13 and the housing 11 are integrally formed, it is impossible for a user to replace the decorative element 13 alone when only the decorative element 13 is damaged. The user must in that case replace the entire display device 1 or put up with the damaged look, either of which is highly undesirable.

To overcome the aforesaid drawbacks, some have redesigned the display device 1 and made the decorative element 13 detachable. Therefore, once the specifications of the housing 11 of the display device 1 are determined, the decorative element 13 can be produced with a different design whenever the manufacturer wishes to give the display device 1a new look, provided that the decorative element 13 conforms to the specifications of the housing 11 and can be assembled to the housing 11. In doing so, not only can production costs be greatly saved, but also decorative elements of the same series (that designed for the same housing 11) are interchangeable, allowing consumers to purchase and replace the decorative element 13 as desired. This detachable feature has boosted the market competitiveness of the display device 1.

Referring again to FIG. 1, the detachable decorative element 13 is typically made of expanded polyethylene (EPE) foam, polyurethane (PU) foam, ethylene-vinyl acetate (EVA) foam, or the like. While such foam materials are advantageously lightweight, resilient, and crush- and impact-resistant, the differently shaped foam-made decorative elements 13 can only be compressed to a limited extent and may have problem being stacked in a compact manner; as a result, both storage and transportation costs are high. Apart from that, the detachable decorative element 13 is typically configured for engaging with the housing 11 by way of physical structures. Therefore, once the foam-made decorative element 13 has been detached and reattached for many times, the portion of the decorative element 13 that is designed to engage with the housing 11 is very likely to get damaged, thus compromising the durability of the decorative element 13, and this demands further improvement.

As stated above, when the decorative element and the housing of a display device are integrally formed, the manufacturer cannot restyle the display device without making new molds, which adds substantially to production costs, and a user is not allowed to change the decorative element of the display device as desired. However, when the decorative element of a display device is made detachable, the typically foam-made decorative element may still cost the manufacturer dearly in production, storage and transportation because of the limited compressibility of the foam material and the difficulty of compactly stacking decorative elements of various shapes; not only that, the foam-made decorative element is subject to damage after long-term use. Hence, the issue to be addressed by the present invention is to solve all the aforementioned problems of the prior art by providing an innovative structure which enables a manufacturer to change the design of the decorative element with ease, which allows the decorative element to be compactly stacked for convenient storage, which greatly facilitates connection between the decorative element and the housing, and which helps the manufacturer reduce the costs of production, storage, transportation, and assembly while enhancing the convenience of use, variability, and durability of the decorative element.

BRIEF SUMMARY OF THE INVENTION

In view of the foregoing drawbacks and problems of the conventional display devices in structural design, the inventor of the present invention put years of practical experience into extensive research and experiment and finally succeeded in developing an engaging structure between a housing and an inflatable element as disclosed herein. It is hoped that the disclosed engaging structure, when applied to a display device, can substantially cut the costs required for manufacturing decorative elements of different designs, effectively lower the costs of storage and transportation due to the high compressibility of the inflatable element, and allow the display device equipped with the inflatable element as its decorative element to be used in a wider range of circumstances, thereby significantly increasing the convenience of use, variability, and durability of the decorative element.

It is an object of the present invention to provide an engaging structure between a housing and an inflatable element, wherein the engaging structure is applicable to a display device and includes a housing and an inflatable element. The housing serves as the casing or protective case of the display device. One side of the housing is configured for the installation of a display screen of the display device. At least one of the other sides of the housing that is adjacent to the display screen is formed with at least one assembly hole. The inflatable element can be assembled to the sides of the housing other than the side where the display screen is installed such that the display screen is exposed to view. The inflatable element has a main body, at least one connecting portion, and a fluid inlet/outlet portion. One side of the main body has a recessed configuration which forms an accommodating space sized to accommodate the sides of the housing other than the side where the display screen is installed. At least one connecting portion is provided on the main body, corresponds in position to the accommodating space, and is formed by an extension of the main body. Moreover, the interior of each connecting portion is in communication with the interior of the main body. Each connecting portion has a connected end connected to the main body and a free end and is sequentially divided, in the direction from the connected end toward the free end, into a base part and a terminal part, both of which parts correspond in position to a corresponding one of the at least one assembly hole. The fluid inlet/outlet portion is provided on the main body. When the fluid inlet/outlet portion is opened, a fluid such as gas or liquid can be blown or pour into or discharged from the main body and the at least one connecting portion through the fluid inlet/outlet portion. When the fluid inlet/outlet portion is closed, gas or liquid cannot freely enter or exit the main body or the at least one connecting portion. When the inflatable element is not inflated, the sides of the housing other than the side where the display screen is installed can be assembled into the accommodating space, and the terminal part of each connecting portion can be inserted into the housing through the corresponding assembly hole. Then, the inflatable element is inflated through the fluid inlet/outlet portion. Once the inflatable element is fully inflated, the base part of each connecting portion is pressed against the periphery of the corresponding assembly hole, with the inflated terminal part of each connecting portion engaged in the corresponding assembly hole. As a result, the portions of the main body that correspond in position to the accommodating space are tightly pressed against the sides of the housing other than the side where the display screen is installed, and the inflatable element is firmly assembled to the housing. The inflatable element, which not only is lightweight but also occupies a tiny space in the deflated state, helps reduce storage and transportation costs. Also, the inflatable element can be easily designed into different shapes and thus significantly enriches the variability of the physical appearance of the display device. Further, the inflatable element, once assembled to the housing of the display device and fully inflated, can provide anti-collision protection for the display device or even provide buoyancy that enables the display device to float on water, thereby adapting the display device for use in more circumstances than traditionally allowed. Moreover, since the present invention does not use glue of any kind to bond the inflatable element to the housing, the materials of the inflatable element and of the housing can be easily detached and recycled, which is in keeping with the trend of environmental protection and sustainable development.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 1:
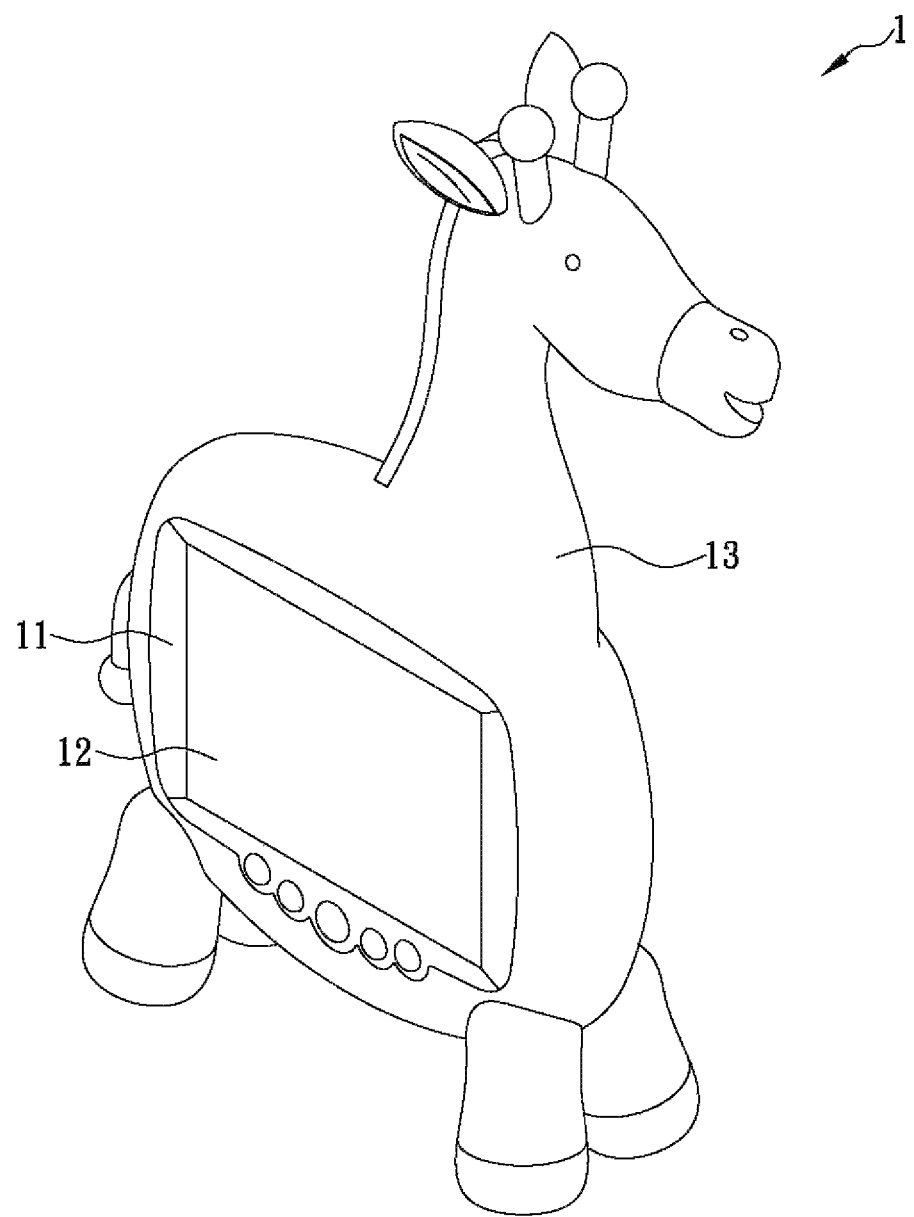
FIG. 1 schematically shows a conventional display device whose decorative element and housing are connected to each other.
Figure 2:
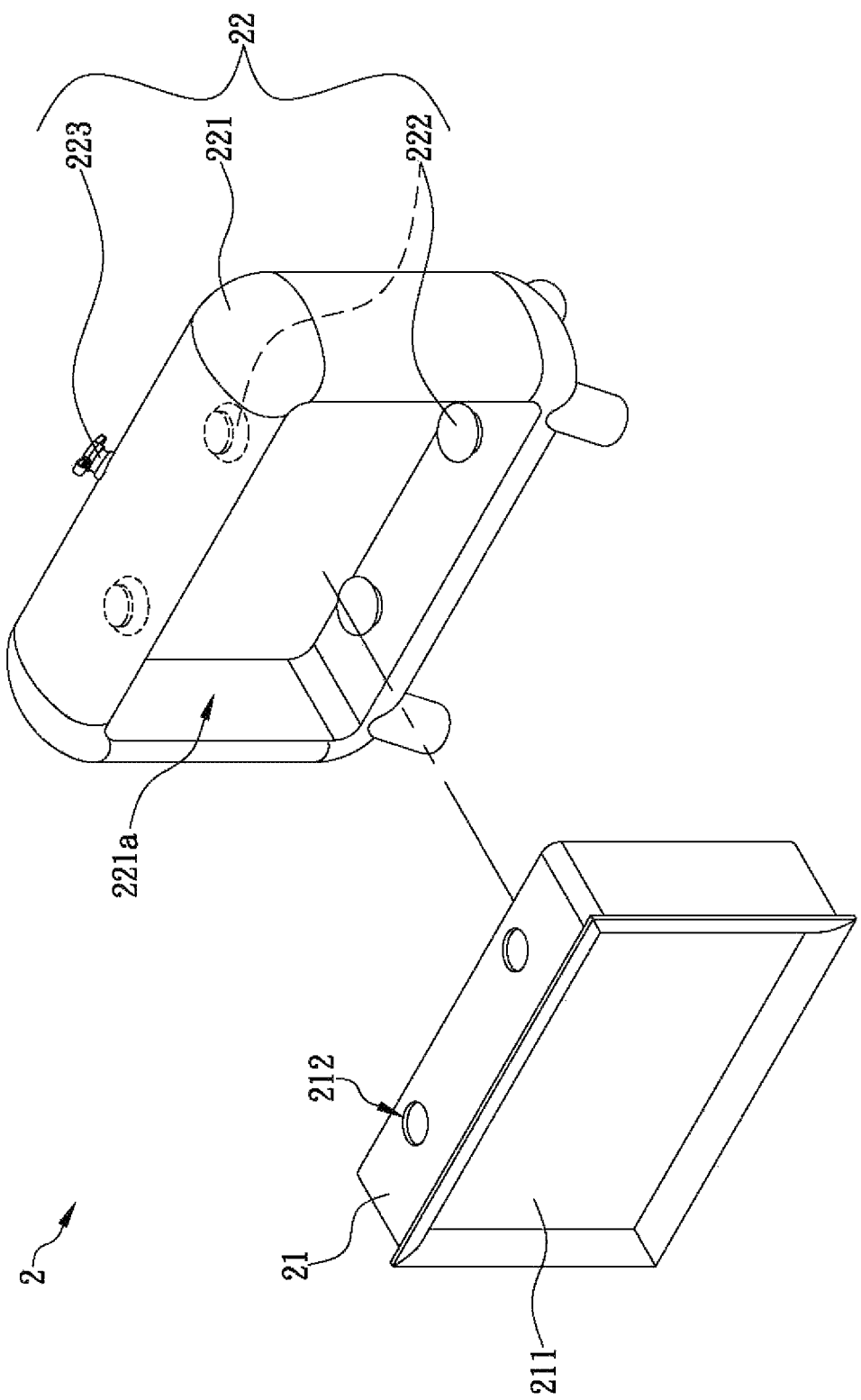
FIG. 2 is an exploded perspective view of the first preferred embodiment of the present invention.

Referring to FIG. 2 for the first preferred embodiment of the present invention, the present invention relates to an engaging structure 2, is applied to a display device (not shown in FIG. 2), and includes a housing 21 and an inflatable element 22. In this embodiment, the housing 21 is formed as the casing of the display device and has one side configured as a window 211 for the installation of a display screen (not shown in FIG. 2) of the display device. The housing 21 may also be designed as a protective case which is applicable to the display device and which has a receiving space 2111 formed with the window 211 so that, when the housing 21 is applied to the display device, the display screen of the display device can be installed in the receiving space 2111, allowing the user to view the display screen through the window 211 of the receiving space 2111. As can be understood by a person of skill in the art, implementation of the housing 21 may vary as needed and is not limited to the foregoing. Additionally, at least one of the other sides of the housing 21 that is adjacent to the display screen is formed with at least one assembly hole 212. In this embodiment, the at least one assembly hole 212 is a plurality of circular through holes formed on the top side and the bottom side of the housing 21. In practice, however, neither the number nor the shape of the at least one assembly hole 212 is limited to the foregoing.

Figure 3:
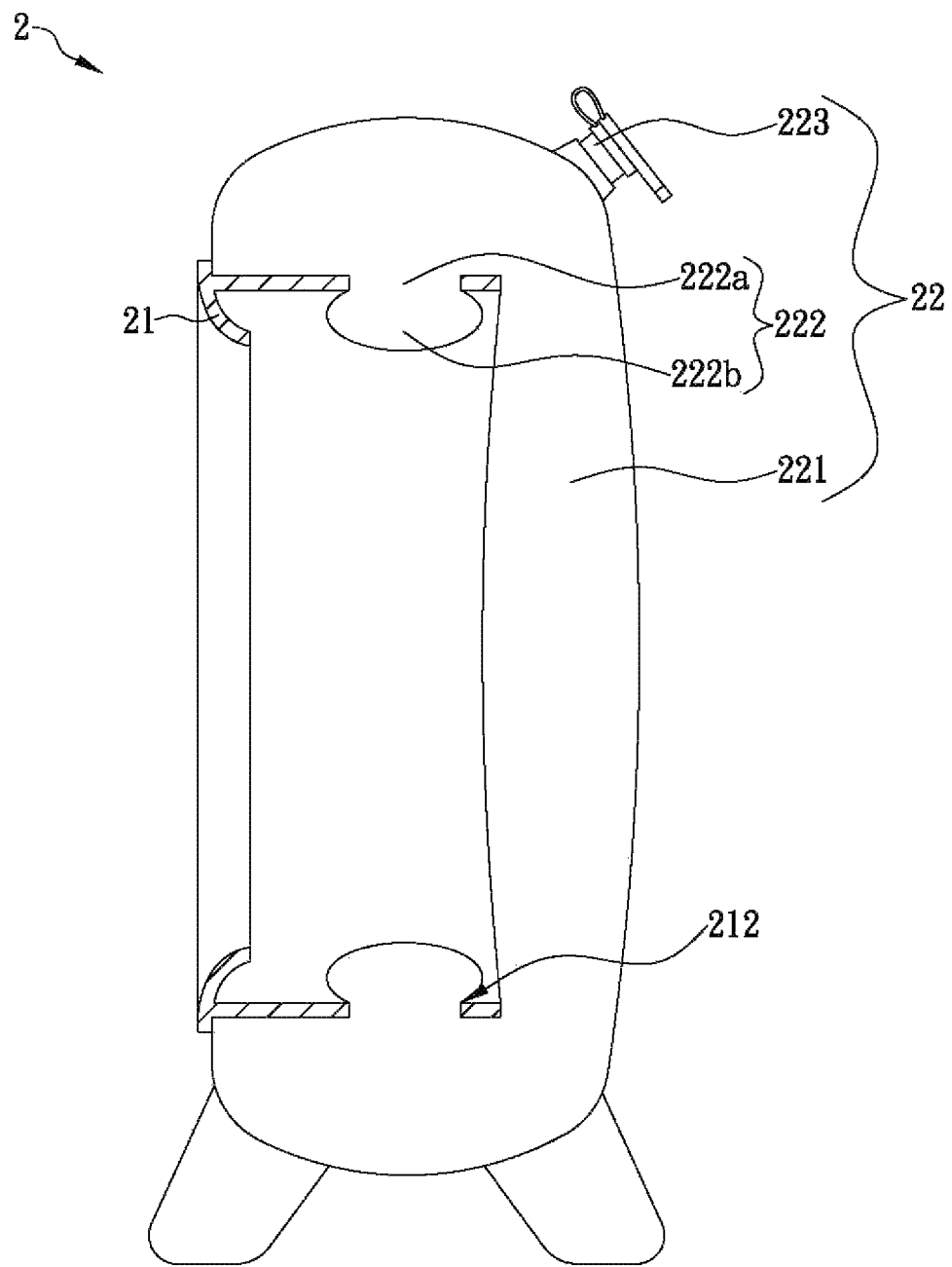
FIG. 3 is a longitudinally (front-to-back) sectional view of the first preferred embodiment of the present invention.

The inflatable element 22 can be assembled to the housing 21 in such a way that the display screen is exposed. The inflatable element 22 includes a main body 221, at least one connecting portion 222, and a fluid inlet/outlet portion 223. In this embodiment, one side of the main body 221 has a recessed configuration that forms an accommodating space 221a. The accommodating space 221a is sized to accommodate the sides of the housing 21 other than the side where the display screen is installed. The at least one connecting portion 222 is provided on the main body 221 and corresponds in position to the accommodating space 221a. Each connecting portion 222 is formed by an extension of the main body 221, with the interior of each connecting portion 222 in communication with the interior of the main body 221. Referring to FIG. 3, each connecting portion 222 has a connected end connected to the main body 221 and a free end, and each connecting portion 222 is sequentially divided, in the direction from the connected end to the free end, into a base part 222a and a terminal part 222b. Once the inflatable element 22 is assembled to the housing 21, the at least one connecting portion 222 corresponds in position to the at least one assembly hole 212 (see FIG. 2). Moreover, when the housing 21 has been assembled to the accommodating space 221a (see FIG. 2), and the inflatable element 22 is in the deflated state, the terminal part 222b of each connecting portion 222 can pass freely through the corresponding assembly hole 212 and thus enter the housing 21.

As shown in FIG. 3, the fluid inlet/outlet portion 223 is provided on the main body 221. When the fluid inlet/outlet portion 223 is opened, a user can inject gas or pour liquid into the inflatable element 22 through the fluid inlet/outlet portion 223, thereby inflating the main body 221 and the at least one connecting portion 222; or the fluid already in the main body 221 and the at least one connecting portion 222 can be discharged to the outside through the fluid inlet/outlet portion 223, thereby reducing the volume of the inflatable element 22. When the fluid inlet/outlet portion 223 is closed, gas or liquid can neither enter nor exit the main body 221 or the at least one connecting portion 222 freely; thus, the inflatable element 22, once inflated, is kept in the inflated state. The design of the fluid inlet/outlet portion 223 is by no means limited to that shown in the drawings. For example, the fluid inlet/outlet portion 223 may be located elsewhere on the main body 221 or have other configurations, provided that the fluid inlet/outlet portion 223 allows passage of fluid into and out of the inflatable element 22.

Reference is now made to FIG. 2 and FIG. 3. When the inflatable element 22 is in the deflated state, the sides of the housing 21 other than the side where the display screen is installed can be assembled into the accommodating space 221a, and the terminal part 222b of each connecting portion 222 can be inserted into the housing 21 through the corresponding assembly hole 212. Then, the inflatable element 22 is inflated through the fluid inlet/outlet portion 223. Once the inflatable element 22 is fully inflated, each connecting portion 222 has its base part 222a pressed against the periphery of the corresponding assembly hole 212 and its inflated terminal part 222b engaged in the corresponding assembly hole 212. As a result, the portions of the main body 221 that correspond to the accommodating space 221a are pressed tightly against the sides of the housing 21 other than the one where the display screen is installed, and the inflatable element 22 and the housing 21 are securely assembled as a single piece.

Figure 4:
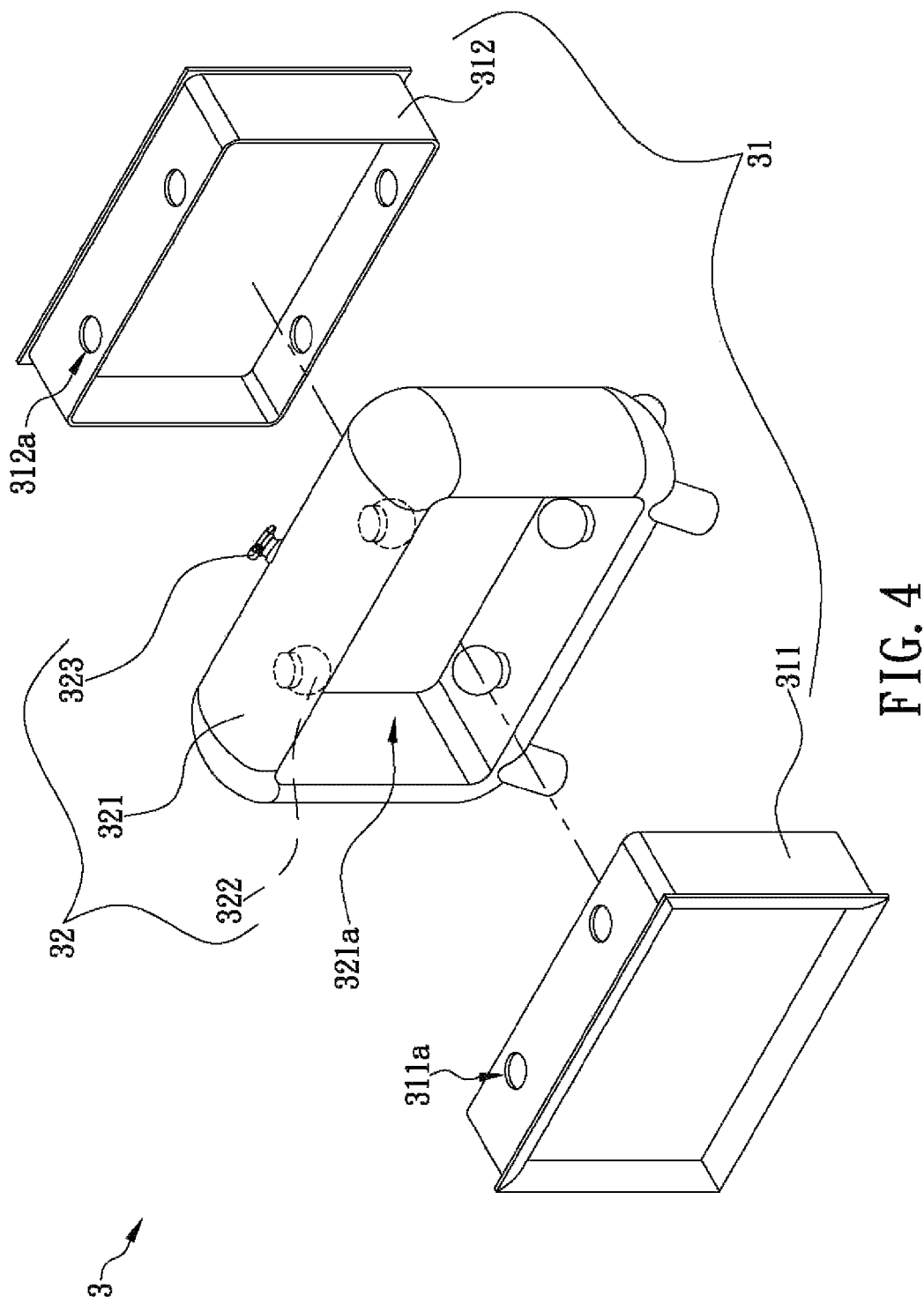
FIG. 4 is an exploded perspective view of the second preferred embodiment of the present invention.

In the second preferred embodiment of the present invention as shown in FIG. 4, the present invention relates to another engaging structure 3, whose housing 31 is composed of a first sub-housing 311 having a first side where a window 3111 is provided for installing a display screen of a display device therein and a second sub-housing 312. The first sub-housing 311 and the second sub-housing 312 are formed with at least one first assembly hole 311a and at least one second assembly hole 312a respectively. In this embodiment, the inflatable element 32 of the engaging structure 3 has a main body 321 centrally formed with an accommodating space 321a. The accommodating space 321a penetrates the main body 321 from the front side through the backside thereof. Once the inflatable element 32 is assembled to the housing 31, the housing 31 is received in the accommodating space 321a.

Figure 5:
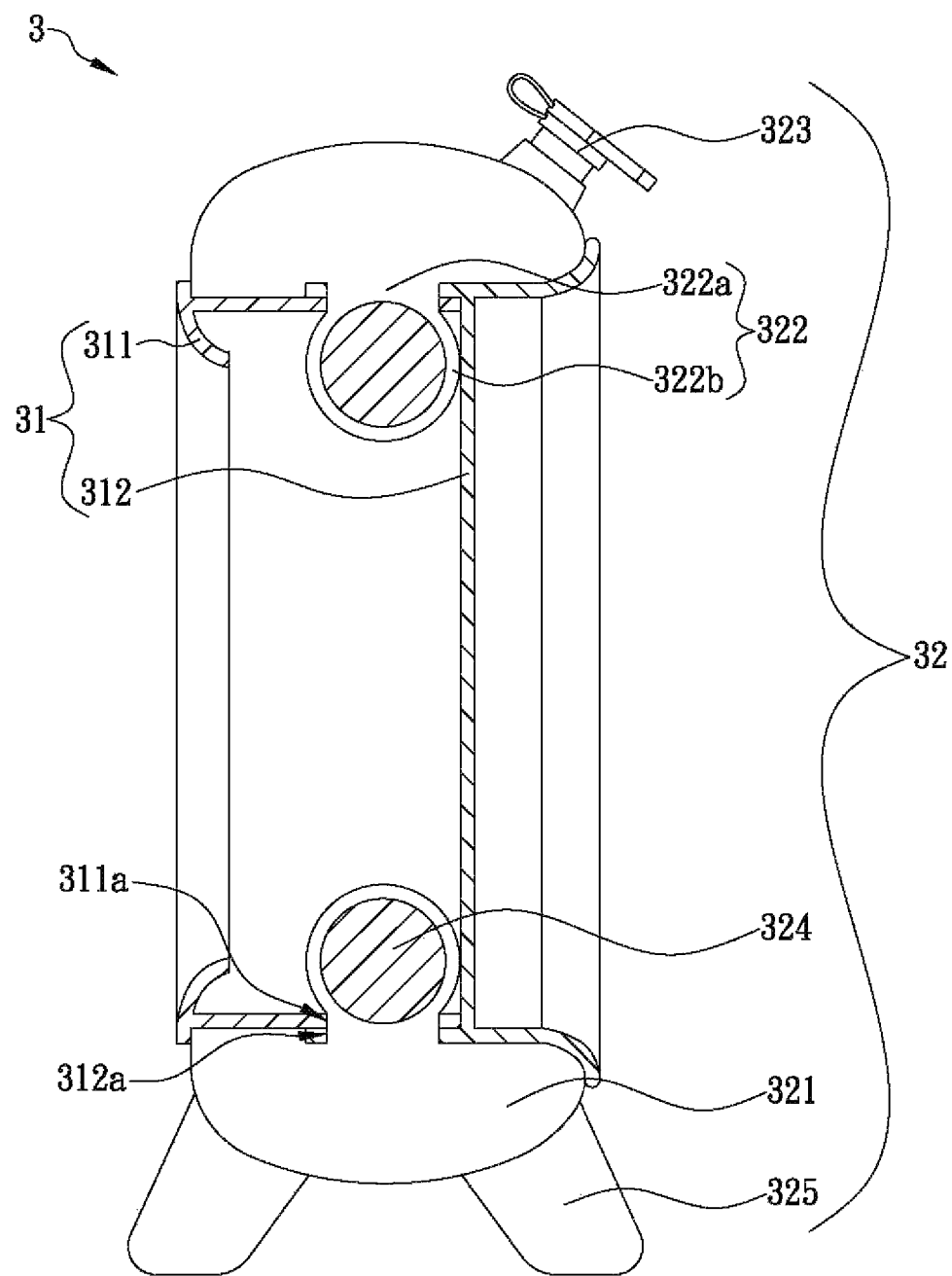
FIG. 5 is a longitudinally (front-to-back) sectional view of the second preferred embodiment of the present invention.

As shown in FIG. 4 and FIG. 5, when the first sub-housing 311 and the second sub-housing 312 are assembled to form the housing 31, each first assembly hole 311a corresponds in position to one second assembly hole 312a, and this allows each connecting portion 322 of the inflatable element 32 to be inserted from outside the housing 31 into the housing 31 sequentially through the corresponding second assembly hole 312a and the corresponding first assembly hole 311a. Then, by injecting fluid into the inflatable element 32 via the fluid inlet/outlet portion 323, both the main body 321 and the at least one connecting portion 322 will be inflated by the gas or liquid. In consequence, the base part 322a of each connecting portion 322 is simultaneously pressed against the periphery of the corresponding first assembly hole 311a and the periphery of the corresponding second assembly hole 312a. Meanwhile, the terminal part 322b of each connecting portion 322 is also inflated and thus stuck in the housing 31.

In this embodiment, the inflatable element 32 is further provided therein with at least one resilient member 324 (see FIG. 5). Each resilient member 324 corresponds in position to one first assembly hole 311a and the corresponding second assembly hole 312a. In addition, each resilient member 324 is fitted in the terminal part 322b of one of the at least one connecting portion 322. The at least one resilient member 324 in this embodiment is made of Styrofoam, and yet the material of which the at least one resilient member 324 is made is not limited thereto. When not subjected to an external force, none of the at least one resilient member 324 can pass through the corresponding first assembly hole 311a and the corresponding second assembly hole 312a. When pushed and elastically deformed by an external force, however, each resilient member 324 can be squeezed through the corresponding first assembly hole 311a and the corresponding second assembly hole 312a. Therefore, when the fluid in the inflatable element 32 gradually leaks outs and fails to keep the inflatable element 32 in the firm, plump, inflated state, the resilient member 324 fitted in each terminal part 322b can prevent each terminal part 322b from coming out of the housing 31 and thereby prevent separation between the inflatable element 32 and the housing 31.

Referring again to FIG. 5, the inflatable element 32 is further provided with a plurality of supporting legs 325, each formed by an extension of the main body 321. Besides, the interior of each supporting leg 325 is in communication with the interior of the main body 321. Once the inflatable element 32 is fully inflated, the supporting legs 325 can support the engaging structure 3, allowing the engaging structure 3 to stand upright on a horizontal surface.

To sum up, referring back to FIG. 2 and FIG. 3, the light weight of the inflatable element 22 and the very small space taken up by the inflatable element 22 in the deflated state allow a manufacturer to save a considerable amount of storage and transportation costs. Besides, the physical appearance of the display device may vary more widely than before because the inflatable element 22 can be readily designed into different shapes. Furthermore, the inflatable element 22, once assembled to the housing 21 of the engaging structure 2 and fully inflated, can protect the display device against collision or even provide buoyancy to help the display device float on water; thus, the range of circumstances to which the display device is applicable is increased. Moreover, since the present invention does not rely on the use of glue to bond the inflatable element 22 and the housing 21 together, the materials of the inflatable element 22 and of the housing 21 can be conveniently detached and recycled, which complies with the trend of environmental protection and sustainable development.

While the invention herein disclosed has been described by means of specific embodiments, numerous modifications and variations could be made thereto by those skilled in the art without departing from the scope of the invention set forth in the claims.

What is claimed is:

1. An engaging structure between a housing and an inflatable element, applicable to a display device, the engaging structure comprising:

a housing formed as a casing of the display device, the housing having a window at a first side where a display screen of the display device is installed and a plurality of second sides, in which at least one of the second sides that is adjacent to the display screen is formed with at least an assembly hole; and an inflatable element to be assembled to the second sides of the housing such that the display screen is exposed, the inflatable element comprising:

a main body having a side of a recessed configuration forming an accommodating space sized to accommodate the second sides of the housing;

at least a connecting portion provided on the main body, corresponding in position to the accommodating space, and formed by an extension of the main body, wherein each said connecting portion corresponds in position to a said assembly hole and has an interior in communication with an interior of the main body; wherein each said connecting portion has a connected end connected to the main body and a free end and is sequentially divided, in a direction from the connected end to the free end, into a base part and a terminal part, both of which correspond in position to a said assembly hole; when the housing has been assembled to the accommodating space, and the inflatable element is not inflated, each said terminal part can pass through the corresponding assembly hole and thus enter the housing;

a fluid inlet/outlet portion provided on the main body; wherein, when the fluid has been injected into the inflatable element through the fluid inlet/outlet portion such that the inflatable element is fully inflated, each said base part is pressed against a periphery of the corresponding assembly hole, and each said terminal part is also inflated and thus stuck in the housing; and at least a resilient member, each said resilient member being fitted in a said terminal part and corresponding in position to a said assembly hole, each said resilient member being unable to pass through the corresponding assembly hole when not subjected to an external force, each said resilient member passing through the corresponding assembly hole when subjected to and deformed by an external force wherein when the inflatable element has been assembled to the housing, and the fluid inlet/outlet portion is opened, a fluid can be injected into or discharged from the main body and the at least a connecting portion through the fluid inlet/outlet portion; and when the fluid inlet/outlet portion is closed, the fluid cannot freely enter or exit the main body or the at least a connecting portion.

2. The engaging structure of claim 1, wherein the inflatable element is further provided with a plurality of supporting legs, each said supporting leg being formed by an extension of the main body and having an interior in communication with the interior of the main body.

3. An engaging structure between a housing and an inflatable element, applicable to a display device, the engaging structure comprising:

a housing formed as a casing of the display device, the housing being assembled from a first sub-housing and a second sub-housing, the first sub-housing having a first side where a window is provided for installing a display screen of the display device therein and a plurality of second sides, in which at least one of the second sides that is adjacent to the display screen is formed with at least a first assembly hole, the second sub-housing being formed with a second assembly hole corresponding in position to each said first assembly hole; and an inflatable element comprising:

a main body centrally formed with an accommodating space, the accommodating space extending from a front side of the main body through a backside of the main body such that the housing is receivable in the accommodating space;

at least a connecting portion provided on the main body, corresponding in position to the accommodating space, and formed by an extension of the main body, wherein each said connecting portion corresponds in position to a said first assembly hole and hence the second assembly hole corresponding to the first assembly hole and has an interior in communication with an interior of the main body; wherein each said connecting portion has a connected end connected to the main body and a free end and is sequentially divided, in a direction from the connected end to the free end, into a base part and a terminal part, both of which correspond in position to a said first assembly hole and hence the second assembly hole corresponding to the first assembly hole; when the housing has been assembled to the accommodating space, and the inflatable element is not inflated, each said terminal part can pass through the corresponding first assembly hole and the corresponding second assembly hole and thus enter the housing;

a fluid inlet/outlet portion provided on the main body; wherein, when the fluid has been injected into the inflatable element through the fluid inlet/outlet portion such that the inflatable element is fully inflated, each said base part is pressed against a periphery of the corresponding first assembly hole and a periphery of the corresponding second assembly hole, and each said terminal part is also inflated and thus stuck in the housing; and at least a resilient member, each said resilient member being fitted in a said terminal part and corresponding in position to a said first assembly hole and hence the second assembly hole corresponding to the first assembly hole, each said resilient member being unable to pass through the corresponding first assembly hole and the corresponding second assembly hole when not subjected to an external force, each said resilient member passing through the corresponding first assembly hole and the corresponding second assembly hole when subjected to and deformed by an external force wherein when the inflatable element has been assembled to the housing, and the fluid inlet/outlet portion is opened, the fluid can be injected into or discharged from the main body and the at least a connecting portion through the fluid inlet/outlet portion; and when the fluid inlet/outlet portion is closed, the fluid cannot freely enter or exit the main body or the at least a connecting portion.

4. The engaging structure of claim 3, wherein the inflatable element is further provided with a plurality of supporting legs, each said supporting leg being formed by an extension of the main body and having an interior in communication with the interior of the main body.

* * * * *